Nov. 13, 1934.     F. C. HUTCHISON     1,980,530
SOLID RING PIPE LINER
Filed Oct. 23, 1931     2 Sheets-Sheet 1

INVENTOR:
Frank C. Hutchison,
BY  ATTORNEYS

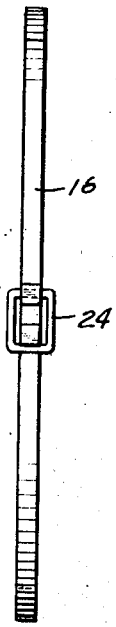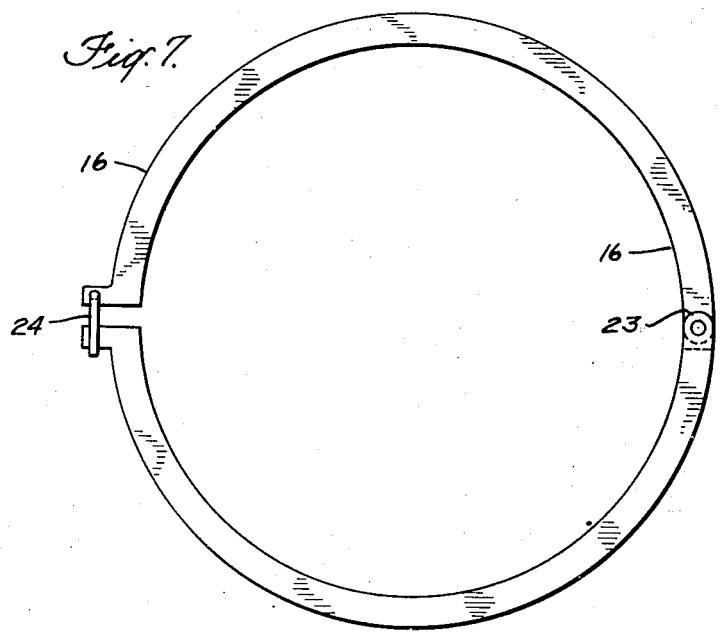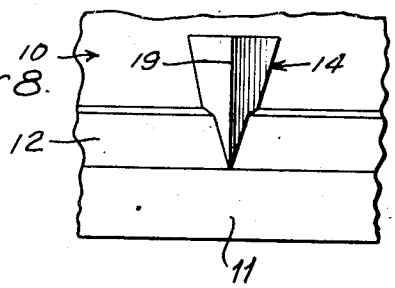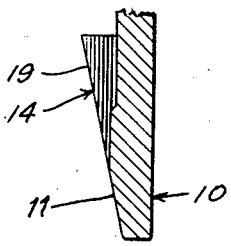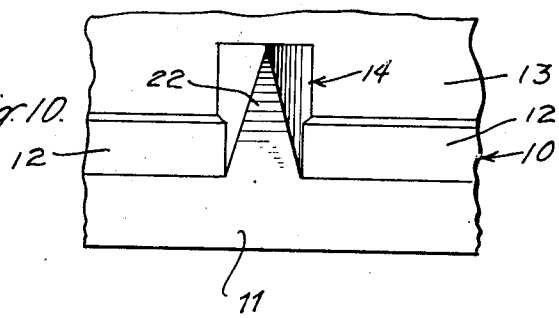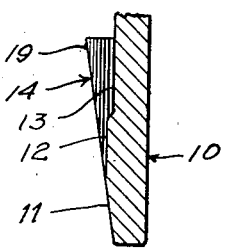

Patented Nov. 13, 1934

1,980,530

UNITED STATES PATENT OFFICE 1,980,530

SOLID RING PIPE LINER

Frank C. Hutchison, Kansas City, Mo., assignor to The Linde Air Products Company, a corporation of Ohio Application October 23, 1931, Serial No. 570,703

6 Claims. (Cl. 285—111)

This invention is a solid ring liner for use in joining the ends of cylindrical objects, such as pipe sections, by means of autogenous welding.

One of the objects of this invention is to provide a liner that can be easily inserted in the ends of such pipe. Another object is to provide a liner that will fit the various sizes of a pipe within the manufacturing tolerance. Another object is to provide a liner that will hold the ends of such pipe sections in axial alinement regardless of the commercial variation in size. Another object is to provide a liner having no pipe spacing portion that must be welded into the joint. Still other objects and novel features will be apparent from the following specification and the accompanying illustration in which:

Figs. 6 and 7 are respectively an edge and side view of the detachable spacing ring.

Figs. 8 and 9 are fragmentary portions of my liner showing one form of centering wedges, and;

Figs. 10 and 11 are fragmentary sections of my liner showing another form of centering wedges.

Figure 1:
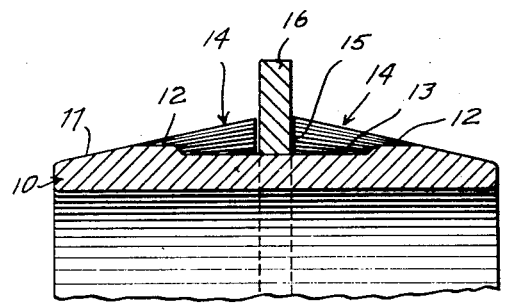
Fig. 1 is a transverse section through one side of my liner near the centering wedges showing the detachable spacing ring located therebetween.
Figure 2:
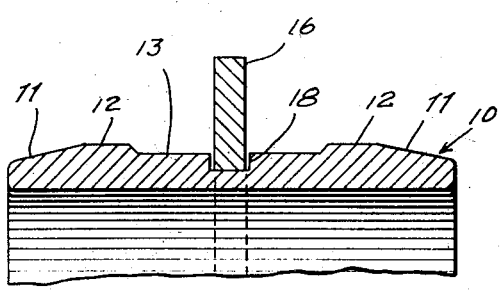
Fig. 2 shows a similar liner without centering wedges and with a central groove for locating the spacing ring.
Figure 3:
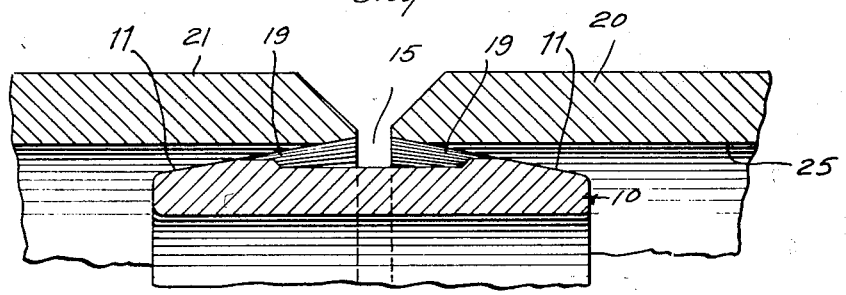
Fig. 3 shows the liner of Fig. 1 assembled in a pipe joint with the spacing ring removed.
Figure 4:
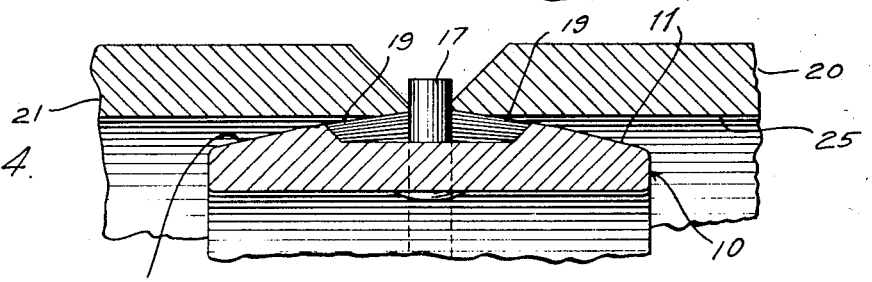
Fig. 4 shows the liner of Fig. 2 with spacing lugs instead of a spacing ring.

My improved pipe liner may be used in joints joined by means of either electric or gas welding, but the liner is especially adapted for joints welded by means of the oxy-acetylene flame.

It is well known that the inside diameter of commercial pipe varies somewhat due to manufacturing tolerance, and with solid ring liners used heretofore it has been necessary to resize the ends of the pipe so that they would fit the liners. The expense of this resizing operation and also that of holding the size of the liners within narrow limits has been overcome by the present liner.

The outer surface of this liner is provided with a cylindrical portion that may in some instances come in contact with the inside of the pipe although usually this surface is spaced from the pipe a short distance as it is desirable to have this diameter slightly less than the smallest diameter of a commercial size of pipe with which the liner is used.

The outer surface of each edge of the liner is bevelled sufficiently so that the liner may be easily inserted into ends of pipe sections under conditions encountered in the field. The central portion of the liner is provided with a recess that spaces this portion of the liner from the ends of the pipe to provide room for weld metal inside the joint and also to prevent the liner from unduly chilling the joint during the welding operation.

In order to center the liner in the various sizes of a particular nominal size pipe and also to hold the ends of such pipe in alinement regardless of their variations in size, the outside of the liner is provided with three or more pairs of centering wedges. Preferably, the outer surfaces of these wedges is tapered toward the edge of the liner and these surfaces make a substantially longitudinal line contact with the inside of the pipe. However, under some conditions, the outer surface of these wedges may be flat instead of a more or less sharp corner.

Between each pair of centering wedges a space is provided to hold a detachable spacing ring. This ring is clamped around the liner between the centering wedges which hold it in place. The thickness of this ring is the same as the separation desired between the abutting ends of the pipe sections, and the width is such that it extends outward beyond the outside of the pipe so that it may be removed after the joint is assembled. This ring is provided with a hinge at one side and a clasp at the other for holding it in place on the liner and for removing it from the joint after it is assembled.

The inner surface of the liner may be cylindrical or it may be tapered outwardly to reduce the resistance to fluid flow through the pipe in which it is used. Also the width and thickness of the liner may be varied according to the size of the pipe and the conditions under which it is used. Furthermore, the liner may be provided with permanent spacing lugs instead of a detachable spacing ring.

The preferred embodiment of my invention is shown in Figs. 1, 3, 8 and 9. The liner 10 shown in these figures is made of iron or steel and the outer surface is provided with a bevelled portion 11 at the edge of the liner; a cylindrical portion 12 inside the bevel 11; and a depressed or recessed central portion 13 between the cylindrical portions 12. Spaced around the outside of the liner at suitable intervals are a number of pairs of centering wedges 14. These wedges are preferably in line along the axis of the liner and between each pair a gap or recess 15 is provided for holding the detachable spacing ring 16 with respect to the liner 10. Other spacing means, such as permanent lugs 17, may be used in place of the ring 16 and a recess 18 may be provided in the liner 10 to hold the spacing ring 16 when no centering wedges 14 are used.

The centering wedges 14 are provided with an edge or corner 19 that tapers toward the outer edge of the liner. This edge 19 forms a substantially longitudinal line contact with the inner surface of the pipe sections 20 and 21. However, under some conditions, the wedges may be provided with a flat outer surface 22 as shown in Fig. 10.

In order to space the ends of the pipe sections 20 and 21, and also to locate the liner 10 within the ends of these sections, the liner is provided with a detachable spacing ring 16 that is clamped to the outside of the liner 10 while it is being assembled in the ends of the pipe sections, such as 20 and 21, and then the ring is removed thereby providing a clear space between the ends of the pipe where they are to be welded together. The spacing ring 16 is provided with a hinge 23 at one side thereof and a clasp 24 to the other side thereof, by which it may be clamped to the liner or removed at will.

Due to the manufacturing tolerance in a given size of pipe the inner surface 25 thereof is usually spaced somewhat from the outer surface 12 of the liner. This distance, however, may be but slightly if any more than the tolerance in the size of the pipe.

The depth of the center recess 13 in the liner 10 may vary in width and depth according to the size of the liner, the size of the pipe in which it is used, and the conditions under which the welds are made.

The number of pairs of centering wedges 14 may be three or more according to the size of the pipe, the amount of tolerance in its size, and other conditions. When the liner is assembled in the ends of the pipe, the outer edges 19 of the centering wedges 14 may embed into the pipe a slight amount and both the pipe and the liner may be slightly deformed in shape. The distance the wedges are embedded in the pipe and the amount the pipe or the liner is deformed will vary according to the amount of tolerance in the size of the pipe, as the slope or taper to the outer edge 19 of the centering wedges 14 is sufficient to make firm contact between the centering wedges and the inside of the pipe within the range of its tolerance. In all cases the centering wedges are embedded in the pipe a sufficient amount to hold the pipe sections and the liner together after the spacing ring 16 has been removed.

Figure 5:
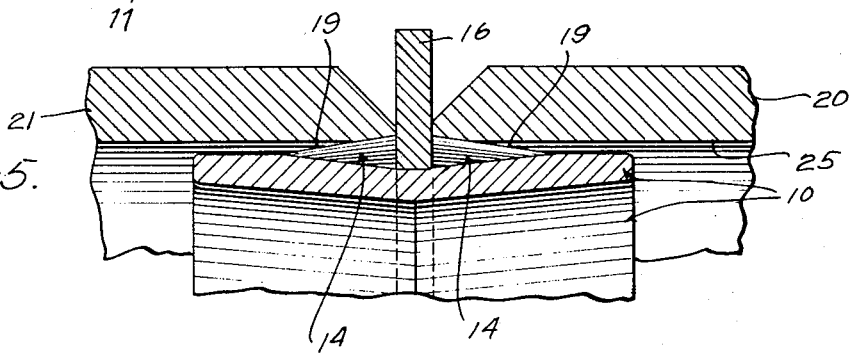
Fig. 5 shows a liner having an outwardly tapered inner surface to reduce the resistance to fluid flow.

While the preferred embodiment of the liner is shown with a cylindrical inner surface, this surface may be tapered outwardly as shown in Fig. 5 when desirable. Furthermore, the tapered surface 11 may be dispensed with in order to provide a thinner liner or more taper to the inner surface thereof. Furthermore, other changes in size, form, and arrangement may be made without departing from the spirit of the invention or the scope of the claims.

I claim:—

1. In a joint between the ends of pipe sections; a liner having a detachable spacing ring for spacing said ends; and a hinge and a clasp in said ring by which it may be detached from said liner after said joint has been assembled.

2. Means adapted to be inserted between the ends of two pipe sections to be joined, for assembling said sections preparatory to welding them end to end; said means comprising an annular metal liner fitting into the opposed ends of said pipe sections, said liner having a plurality of pairs of integral centering wedges tapering downwardly from about the center of the liner toward the edges thereof, the opposed ends of each pair of wedges being separated by a gap, the plurality of gaps being circumferentially in line about the liner and adapted to register with the space between the opposed ends of said pipe sections.

3. The invention as defined in claim 2, characterized in that the integral centering wedges are provided with acute angled edges whereby said wedges are adapted to engage the pipe sections along lines of contact only.

4. Means adapted to be inserted between the ends of two pipe sections to be joined, for assembling said sections preparatory to welding them end to end, said means comprising an annular metal liner fitting into the opposed ends of said pipe sections, and a spacing ring mounted upon and extending circumferentially of said liner to engage said opposed ends and space them apart a uniform distance, said ring being removable from said liner.

5. The invention as defined in claim 4, characterized in that the liner is provided with circumferential recess means for receiving the inner edge of said spacing ring, whereby to temporarily locate the spacing ring in position during an assembling operation.

6. The invention as defined in claim 4, characterized in that the liner is provided with a plurality of pairs of integral centering wedges tapering downwardly from about the center of the liner toward the edges thereof, the opposed ends of each pair of wedges being separated by a gap, and the plurality of gaps being circumferentially in line about the liner and serving as a recess means to receive the inner edge of said spacing ring and temporarily to locate the latter in position during an assembling operation.

FRANK C. HUTCHISON.